(12) United States Patent
Zheng et al.

(10) Patent No.: US 7,659,220 B1
(45) Date of Patent: Feb. 9, 2010

(54) SEALING COMPOSITION FOR SEALING ALUMINUM NITRIDE AND ALUMINUM OXYNITRIDE CERAMICS

(75) Inventors: Yi Zheng, Lynnfield, MA (US); Richard C. Marlor, Beverly, MA (US); George C. Wei, Weston, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 12/327,207

(22) Filed: Dec. 3, 2008

(51) Int. Cl.
*C03C 8/14* (2006.01)
*C03C 8/18* (2006.01)
(52) U.S. Cl. .............................. 501/17; 501/15; 501/19
(58) Field of Classification Search ............. 501/15, 501/17, 19
See application file for complete search history.

(56) References Cited

U.S. PATENT DOCUMENTS

| 3,588,573 | A | 6/1971 | Chen et al |
| 4,076,991 | A | 2/1978 | Datta |
| 4,103,200 | A | 7/1978 | Bhalla |
| 4,291,250 | A | 9/1981 | Bhalla |
| 5,075,587 | A | 12/1991 | Pabst et al. |
| 5,231,062 | A | 7/1993 | Mathers et al. |
| 5,924,904 | A | 7/1999 | Fujii et al. |
| 7,362,053 | B2 | 4/2008 | Wei et al. |

FOREIGN PATENT DOCUMENTS

| DE | 19727304 | A | * | 12/1998 |
| EP | 0371315 | A2 | | 6/1990 |
| EP | 1721880 | A1 | | 11/2006 |
| JP | 53-59897 | A | * | 5/1978 |
| JP | 55-148307 | A | * | 11/1980 |
| JP | 56-69802 | A | * | 6/1981 |
| JP | 61-10083 | A | * | 1/1986 |
| JP | 61-86445 | A | * | 5/1986 |
| WO | WO03060952 | A1 | | 7/2003 |

OTHER PUBLICATIONS

Abstract, JP 09-92206, [Apr. 1997].
Norton, Thermodynamic considerations in the thick-film metallization of aluminum nitride substrates, J. Mater. Sci. Letters, 9 (1990) 91-93.
Krueger et al., Hermetic Glass Sealing of AlN Packages for High Temperature Applications, J. Eur. Ceram. Soc. 19 (1990) 1067-1070.
Baik et al., Liquid-Phase Bonding of Silicon Nitride Ceramics, J. Am. Ceram. Soc., 70 [5] (1987) C-105-C-107.
Baik et al., Suppression of Frothing by Silicon Addition During Oxynitride Glass Synthesis, J. Am. Ceram. Soc., 68 [7] (1985) C-168-C-170.
Tsai et al., Interfacial adhesion and microstructure of thick film metallized aluminum nitride substrates, Ceramics International 28 (2002) 23-28.

* cited by examiner

*Primary Examiner*—Anthony J Green
(74) *Attorney, Agent, or Firm*—Robert F. Clark

(57) ABSTRACT

There is described a sealing composition for sealing aluminum nitride and aluminum oxynitride ceramics comprising: a mixture of $SiO_2$, at least one other metal oxide, and a silicon additive comprising at least one of silicon metal or a silicide. The silicon additive acts to suppress the formation of nitrogen bubbles during the sealing of articles comprised of aluminum nitride or aluminum oxynitride ceramics, e.g., as in the case of a ceramic discharge vessel for a high intensity discharge lamp.

8 Claims, 2 Drawing Sheets

SEALING COMPOSITION FOR SEALING ALUMINUM NITRIDE AND ALUMINUM OXYNITRIDE CERAMICS

TECHNICAL FIELD

The present invention relates to aluminum nitride and aluminum oxynitride ceramics and in particular to the use of such ceramics for arc discharge vessels in high-intensity discharge (HID) lamps, e.g., metal halide lamps and high-pressure sodium lamps (HPS).

BACKGROUND OF THE INVENTION

Metal halide and high-pressure sodium lamps are two examples of lamps which use a discharge vessel made of a ceramic material. The robustness of the ceramic material permits the use of more corrosive chemical fills and allows the discharge vessels to be operated at higher temperatures. A sealing composition, commonly referred to as a frit, is used to form a hermetic seal between the feedthrough sections of the electrodes and the ceramic body of the discharge vessel. The sealing composition may also be used to join together the ceramic pieces which form the discharge vessel.

FIG. 1 shows a discharge vessel 1 for a conventional ceramic metal halide lamp. The discharge vessel 1 includes a hollow ceramic body 6 filled with a chemical fill 8 and into which electrodes 14 are fed through ceramic capillaries 2. The discharge vessel has halves 17a,b that are joined at seam 5, where the electrode ends 3 are inside the respective halves and extend into the discharge chamber 12. The distal ends of the capillaries are each sealed with a respective frit seal 9. A conventional $Al_2O_3$—$Dy_2O_3$—$SiO_2$ sealing composition for this purpose is described in U.S. Pat. No. 4,076,991.

Translucent polycrystalline alumina (PCA) has been by far the ceramic material of choice for making ceramic discharge vessels. Yet despite its pervasive use, PCA is not used in some HID applications because it is only translucent and not transparent. In particular, a PCA discharge vessel is generally not suitable for focused-beam, short-arc lamps such as projection lamps and automotive headlights. For these applications, the transparent sapphire (single-crystal) form of aluminum oxide is used. In addition, PCA discharge vessels although superior to quartz arc tubes in metal halide lamps can react with the rare earth halide fills limiting the durability and life of such lamps.

Aluminum oxynitride (AlON) is a transparent ceramic material that has been identified as a potential replacement for PCA. See, for example, Japanese Patent No. 09-92206 and U.S. Pat. Nos. 5,924,904 and 5,231,062. AlON has a cubic spinel structure and a composition that may be generally represented by the empirical formula $Al_{(64+x)/3}O_{32-x}N_x$ where $2.75 \leq x \leq 5$. The mechanical strength and thermal expansion of AlON are close to those of PCA, so that AlON should be able to survive the stresses in high-intensity discharge lamps.

Aluminum nitride (AlN) has been shown to be more resistant to the corrosive effects of rare earth metal halide fills than polycrystalline aluminum oxide. Although the fully-dense sintered AlN ceramic is only translucent and not transparent, the superior corrosion resistance is desirable for metal halide lamps. For example, the use of AlN arc discharge vessels for ceramic metal halide lamps is described in European Patent Application No. 0371315A1 and PCT Application No. WO 03/060952.

Despite the potential advantages of aluminum nitride and aluminum oxynitride ceramics, there remain a number of technical difficulties which must be overcome for these materials to be considered for use in HID lamp applications. One in particular is the reaction of these ceramics with the conventional silica-containing glass/ceramic frit materials used to seal the discharge vessels. As described above, the function of the frit is to hermetically seal the ceramic body of the discharge vessel, in particular to the feedthrough portion of the electrode assembly. During the sealing operation, contact between the molten frit and the aluminum nitride or aluminum oxynitride ceramic induces a reaction that releases nitrogen gas. Since most of the nitrogen evolved from the reaction cannot be accommodated in the molten frit, it escapes as gas bubbles into the frit seal. These gas bubbles may degrade the quality and function of the hermetic seal leading to premature failure of the lamp, particularly when higher pressures are present in the discharge vessel.

U.S. Pat. No. 7,362,053 describes a method for minimizing bubble formation in the seal region of an aluminum oxynitride discharge vessel by forming a less reactive surface layer in the seal region. In one embodiment, this is accomplished by heating at least the seal region of the discharge vessel in a reducing atmosphere. In another embodiment, an aluminum oxide layer is deposited in the seal region to act as a barrier between the molten frit and the aluminum oxynitride vessel during sealing.

While such methods are effective, it would be simpler and more advantageous if a sealing frit composition could be formulated in such a way to reduce or eliminate bubble formation in the seal without the need for additional treatments on the sintered discharge vessel.

SUMMARY OF THE INVENTION

It is an object of the invention to obviate the disadvantages of the prior art.

It is another object of the invention to provide a sealing composition for sealing aluminum nitride and aluminum oxynitride ceramics that reduces or eliminates bubble formation in frit seals.

In accordance with an object of the invention, there is provided a sealing composition for sealing aluminum nitride and aluminum oxynitride ceramics comprising: a mixture of $SiO_2$, at least one other metal oxide, and a silicon additive comprising at least one of silicon metal or a silicide. (As used herein, silicon and silica are considered a metal and a metal oxide, respectively.) Preferably, the other metal oxide is selected from $Al_2O_3$, $Dy_2O_3$, $CeO_2$, $Gd_2O_3$, $Y_2O_3$, $Eu_2O_3$, $Tm_2O_3$, $Ho_2O_3$, $CaO$, $MgO$, $BaO$, $La_2O_3$, $V_2O_5$, $WO_3$, $MoO_3$ and $ZrO_2$. More preferably, the other metal oxide is selected from $Al_2O_3$, $Dy_2O_3$, $CeO_2$, $Y_2O_3$, $CaO$, and $MgO$. The silicide preferably is a silicide of W, Mo, Ta, Nb, Pd, Re, Pt, or Rh. More preferably, the silicide is tungsten silicide or molybdenum silicide.

In a preferred embodiment, the sealing composition contains at least 1 percent by weight $SiO_2$.

In a more preferred embodiment, the sealing composition consists essentially of a mixture of silicon metal powder and an oxide mixture consisting essentially of 20 wt. % $Al_2O_3$, 15 wt. % $SiO_2$ and 65 wt. % $Dy_2O_3$.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

A preferred frit material for sealing ceramic discharge vessels is the $Dy_2O_3$—$Al_2O_3$—$SiO_2$ glass-ceramic system. This system is widely used by lighting manufacturers to seal PCA discharge vessels because of its halide resistance and favorable melting and thermal expansion characteristics. The $Dy_2O_3$—$Al_2O_3$—$SiO_2$ frit seal consists of DA ($3Dy_2O_3$-$5Al_2O_3$) and DS (Dy—Si—O) crystalline phases in a Dy—Al—Si—O glassy matrix. When sealed to PCA parts, some alumina from the PCA part is dissolved in the frit at the frit-PCA interface, but there are typically no bubbles in the frit seals of the PCA parts. As described previously, this is not the case when the same frit is used with aluminum nitride or aluminum oxynitride parts.

The general reaction of a divalent metal oxide with aluminum nitride can be expressed as:

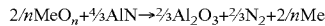

For silica ($SiO_2$) in the sealing frit, the reaction is:

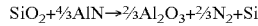

Figure 2:
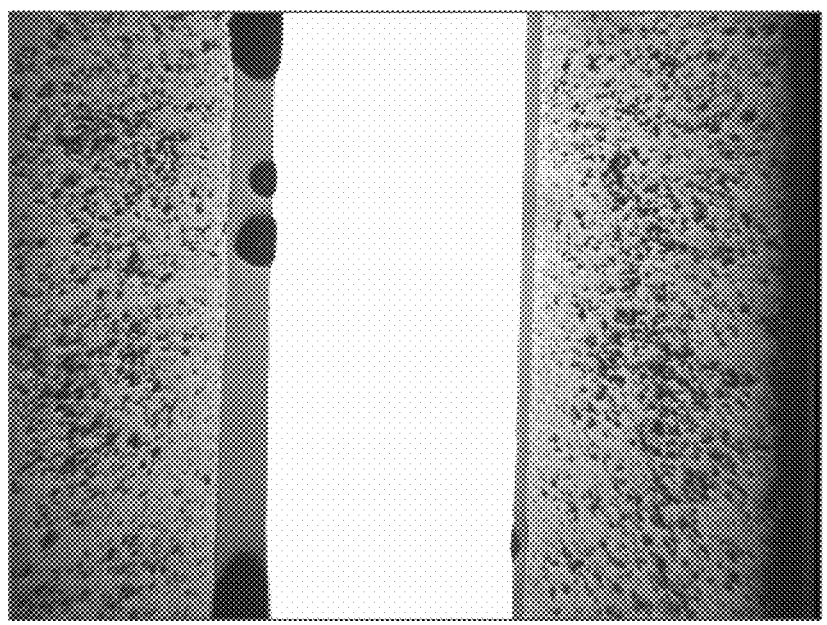
FIG. 2 is a photomicrograph of a cross section of a frit-sealed aluminum nitride ceramic using a conventional silica-containing frit.

The change in the Gibbs free energy, $\Delta G$, is negative at the temperature of the sealing process favoring the release of nitrogen during sealing. Analogous reactions occur in the case of aluminum oxynitride also resulting in the release of nitrogen gas during sealing. Since not all of the nitrogen can be absorbed into the molten frit material, bubble formation occurs as shown in the photomicrograph of FIG. 2.

The present invention adds silicon to the silica-containing sealing frit to reduce bubble formation. In particular, a silicon additive in the form of powdered silicon metal or a powdered silicide such as tungsten or molybdenum silicide is used to shift the reaction equilibrium back towards the reactants thereby decreasing the release of nitrogen and reducing bubble formation. Preferably, the silicon additive comprises 0.1 to 5 weight percent (wt. %) of the sealing composition. More preferably, the silicon additive comprises 0.5 to 2.5 weight percent (wt. %) of the sealing composition. Other silicides in that may be used include silicides of Ta, Nb, Pd, Re, Pt and Rh.

As used herein, a silica-containing frit means a frit (or sealing composition) containing at least 1 wt. % $SiO_2$. Silica is added for two purposes: (1) to lower the melting point of the frit and (2) to generate a glassy or amorphous phase. Lowering the melting point is important so that volatile materials like mercury are not lost during the final sealing of the discharge vessel. For example, a $Dy_2O_3$—$Al_2O_3$ frit melts at >1760° C. without silica, but adding silica can lower the melting point to ~1540° C. The addition of silica also gives rise to a glass or amorphous phase instead of the completely crystalline phases observed in $SiO_2$-free frits. The glassy phases have a gradual and much smaller volume change during solidification so that the seal remains free of cracks. Crystalline phases typically have an abrupt 5-20% volume change during solidification which leads to microcracks in the seal causing the seal to be mechanically weak and lack hermeticity. Examples of other silica-containing frits include $CeO_2$—$Al_2O_3$—$SiO_2$, $Gd_2O_3$—$Al_2O_3$—$SiO_2$, $Y_2O_3$—$Al_2O_3$—$SiO_2$, and $Eu_2O_3$—$Al_2O_3$—$SiO_2$. In addition to the above-mentioned metal oxides, the following additional metal oxides may also be used in the sealing composition: $Tm_2O_3$, $Ho_2O_3$, CaO, MgO, BaO, $La_2O_3$, $V_2O_5$, $WO_3$, $MoO_3$ and $ZrO_2$.

EXAMPLES

FIG. 2 is a cross-sectional photomicrograph of an aluminum nitride capillary that has been sealed with a frit consisting of 20 wt. % $Al_2O_3$, 15 wt. % $SiO_2$ and 65 wt. % $Dy_2O_3$ ($20Al_2O_3$-$15SiO_2$-$65Dy_2O_3$). The presence of gas bubbles in the seal is readily apparent.

Figure 1:
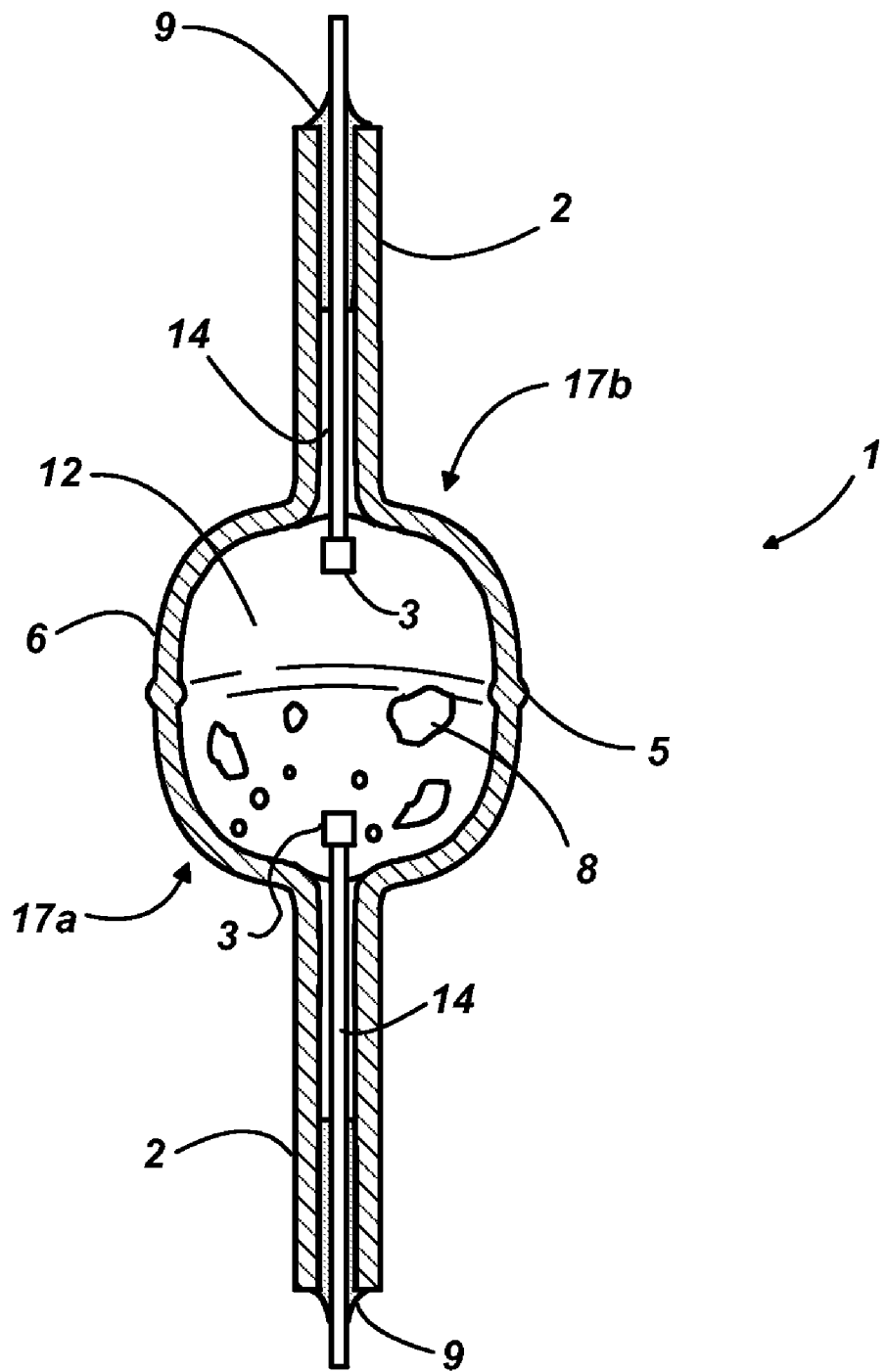
FIG. 1 is a cross-sectional illustration of a conventional ceramic metal halide, high intensity discharge lamp.
Figure 3:
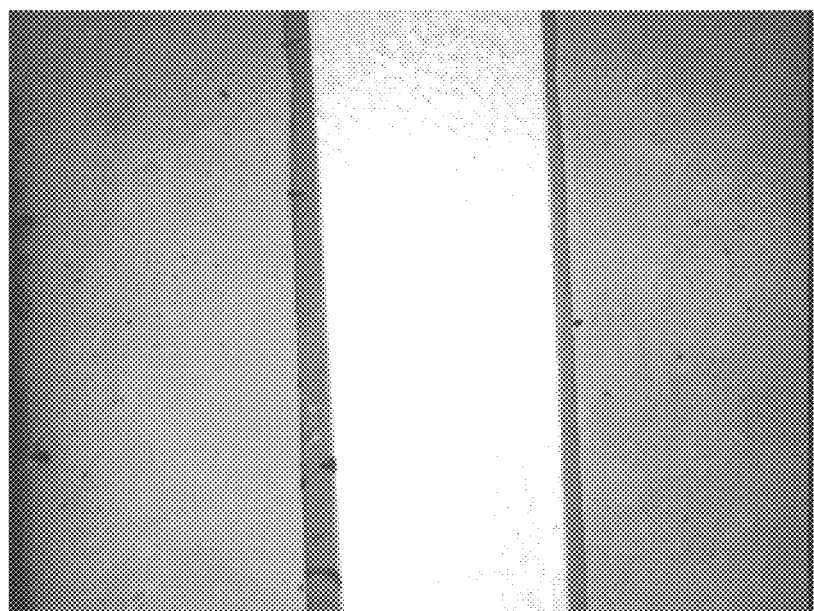
FIG. 3 is a photomicrograph of a cross section of a second frit-sealed aluminum nitride ceramic using the sealing frit composition of this invention.

FIG. 3 is a cross-sectional photomicrograph of a similar aluminum nitride capillary sealed with the same $20Al_2O_3$-$15SiO_2$-$65Dy_2O_3$ frit used in FIG. 1 except that 5 wt. % Si has been added based on the weight of the oxide mixture. In this case, there are no discernible gas bubbles in the frit which indicates that the addition of Si has suppressed the release of nitrogen during the sealing process.

While there have been shown and described what are at present considered to be preferred embodiments of the invention, it will be apparent to those skilled in the art that various changes and modifications can be made herein without departing from the scope of the invention as defined by the appended claims.

We claim:

1. A sealing composition consisting essentially of a mixture of silicon metal powder and an oxide mixture consisting essentially of 20 wt. % $Al_2O_3$, 15 wt. % $SiO_2$ and 65 wt. % $Dy_2O_3$.

2. The sealing composition of claim 1 wherein the amount of silicon metal powder is 5 percent of the weight of the oxide mixture.

3. A sealing composition for sealing aluminum nitride and aluminum oxynitride ceramics comprising: a mixture of $SiO_2$, $Al_2O_3$, $Dy_2O_3$, and a silicon additive comprising at least one of silicon metal or a silicide.

4. The sealing composition of claim 3 wherein the silicide is a silicide of W, Mo, Ta, Nb, Pd, Re, Pt, or Rh.

5. The sealing composition of claim 3 wherein the mixture contains at least 1 percent $SiO_2$ by weight.

6. The sealing composition of claim 3 wherein the silicide is tungsten silicide or molybdenum silicide.

7. The sealing composition of claim 3 wherein the silicon additive comprises 0.1 to 5 weight percent of the mixture.

8. The sealing composition of claim 3 wherein the silicon additive comprises 0.5 to 2.5 weight percent of the mixture.

* * * * *